W. B. MACAULAY.
TRACTOR CHAIN.
APPLICATION FILED AUG. 10, 1914.
1,170,836.
Patented Feb. 8, 1916.
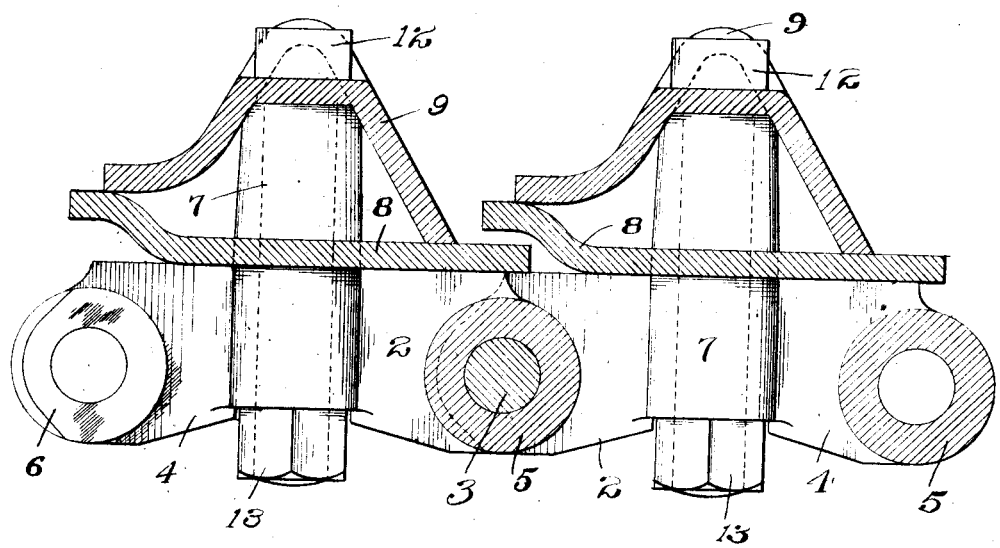
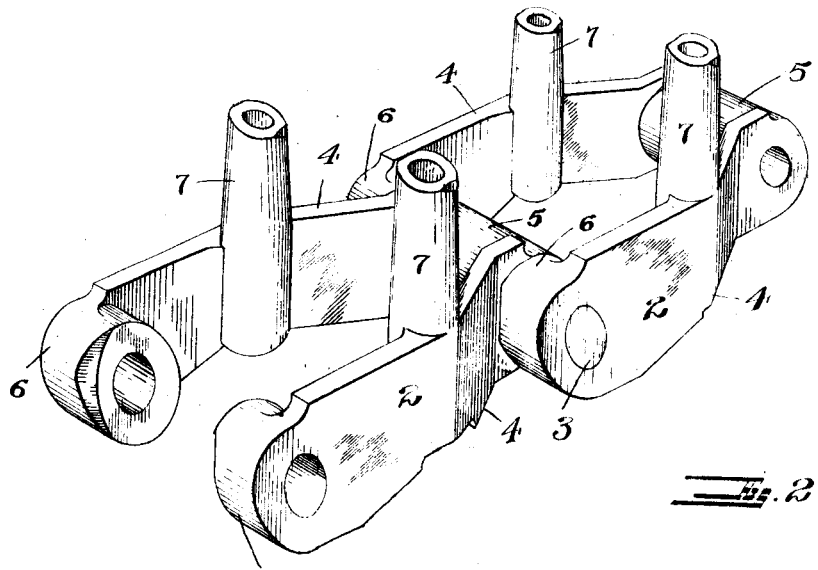
WITNESSES:
INVENTOR.
W. B. MACAULAY
BY Miller & White
his ATTORNEYS

UNITED STATES PATENT OFFICE.

WALTER B. MACAULAY, OF MARYSVILLE, CALIFORNIA, ASSIGNOR TO THE YUBA CONSTRUCTION COMPANY, A CORPORATION OF CALIFORNIA.

TRACTOR-CHAIN.

1,170,836.                                  Specification of Letters Patent.                    Patented Feb. 8, 1916.

Application filed August 10, 1914. Serial No. 856,069.

*To all whom it may concern:*

Be it known that I, WALTER B. MACAULAY, a citizen of the United States, and a resident of Marysville, Yuba county, State of California, have invented certain new and useful Improvements in Tractor-Chains, of which the following is a specification.

The invention relates to tread chains of track-laying tractors.

The object of the invention is to provide an improved form of tractor chain.

Another object of the invention is to provide a tractor chain of such construction that the shear on the bolt holding the tread plate to the chain link is reduced.

The invention possesses other advantageous features, some of which, with the foregoing, will be set forth at length in the following description where I shall outline in full that form of the invention which I have selected for illustration in the drawings accompanying and forming part of the present specification.

In the drawings I have shown only one specific form of my invention, but it is to be understood that I do not limit myself to such form. It is also understood that by the claims succeeding the description of my invention, I desire to cover the invention in whatever form it may be embodied.

Referring to said drawings: Figure 1 is a longitudinal section of two links of the tractor chain, showing the tread plates attached. Fig. 2 is a perspective view of two connected links of the tractor chain.

The chain of my invention consists of a plurality of links 2 hinged together by pivot pins 3. Each link is formed of two legs 4, which converge toward one end of the link, so that the link is wider at one end than at the other. At the narrow end the legs are joined by the hollow cylindrical sleeve 5, and at the wide end, the legs are provided with hollow bosses 6. The narrow end of one link fits between the bosses on the adjacent link and the hinge pin is disposed in the bosses and sleeve.

Arranged on each leg 4 of the link and preferably about midway between the ends, is a hollow upwardly projecting lug or boss 7, which extends from the bottom of the leg to a plane above the upper face of the link, and which is preferably arranged at right angles to the hinge pin. The lower surface of the leg is provided with a depression at the base of the upwardly projecting boss.

The tread preferably comprises a base plate 8 which lies against the upper surface of the link and which is provided with apertures through which the bosses 7 extend. The base plate is preferably curved upward at one end so that it overlies the edge of the adjacent base plate, partly closing the joint between the two.

The tread plate 9 is curved or bent transversely so that it presents a rounded transverse rib to the ground surface and the bosses 7 extend up into and support the rib. The tread plate is preferably formed with depressions in its upper surface in which the heads of the bolts 12 are disposed and the lower faces of these depressions bear against the upper ends of the bosses 7. The bolt 12 passes through the tread plate and boss 7 and is held secure by the nut 13. The upper edges of the bosses are preferably beveled so that the bosses fit snugly into the bent tread plate. The bosses 7 not only support the curved tread plate, but they carry substantially all of the shearing strain produced, and thereby relieve the bolts of the shearing strain. This arrangement produces a very sturdy tread which withstands all of the great strains which are placed on the tread and produces a tread which obtains a gripping hold on the surface over which the tractor travels.

I claim:

1. In a tractor tread chain, a link, a hollow boss thereon projecting above the surface of the link, a curved tread plate and a bolt extending through said boss and tread plate.

2. In a tractor tread chain, a link having two legs and an integral hollow upstanding boss on each leg projecting above the surface of the link, said boss being arranged midway between the ends of the link.

3. In a tractor tread chain, a link having two legs, a hollow boss on each leg projecting above the surface of the link, a curved tread plate resting against said bosses, and bolts extending through said plate and bosses.

In testimony whereof, I have hereunto set my hand at Marysville, California, this 30th day of July, 1914.

WALTER B. MACAULAY.

In presence of—
P. R. PARKER,
W. H. CARLIN.